(12) United States Patent
Itagaki et al.

(10) Patent No.: US 11,333,225 B2
(45) Date of Patent: May 17, 2022

(54) PRESSING DEVICE FOR TOROIDAL CONTINUOUSLY VARIABLE TRANSMISSION

(71) Applicants: NSK LTD., Tokyo (JP); KAWASAKI JUKOGYO KABUSHIKI KAISHA, Hyogo (JP)

(72) Inventors: Hirofumi Itagaki, Fujisawa (JP); Masahiro Kita, Fujisawa (JP); Kippei Matsuda, Akashi (JP); Kenichiro Tanaka, Akashi (JP); Hideyuki Imai, Akashi (JP); Kenji Komatsu, Akashi (JP)

(73) Assignees: NSK LTD., Tokyo (JP); KAWASAKI JUKOGYO KABUSHIKI KAISHA, Hyogo (JP)

( * ) Notice: Subject to any disclaimer, the term of this patent is extended or adjusted under 35 U.S.C. 154(b) by 366 days.

(21) Appl. No.: 16/495,451

(22) PCT Filed: Mar. 20, 2018

(86) PCT No.: PCT/JP2018/011171
§ 371 (c)(1),
(2) Date: Sep. 19, 2019

(87) PCT Pub. No.: WO2018/174086
PCT Pub. Date: Sep. 27, 2018

(65) Prior Publication Data
US 2020/0063837 A1 Feb. 27, 2020

(30) Foreign Application Priority Data

Mar. 21, 2017 (JP) ............................. JP2017-054928

(51) Int. Cl.
*F16H 15/38* (2006.01)
*F16H 57/04* (2010.01)

(52) U.S. Cl.
CPC ........... *F16H 15/38* (2013.01); *F16H 57/042* (2013.01)

(58) Field of Classification Search
CPC ............................... F16H 15/38; F16H 57/042
See application file for complete search history.

(56) References Cited

U.S. PATENT DOCUMENTS

| 5,899,827 A | 5/1999 | Nakano et al. |
| 2002/0198077 A1* | 12/2002 | Watanabe ............... F16H 15/38 476/42 |

(Continued)

FOREIGN PATENT DOCUMENTS

| GB | 740673 A | 11/1955 |
| JP | 30-6957 B1 | 9/1955 |

(Continued)

OTHER PUBLICATIONS

International Search Report and Written Opinion dated May 15, 2018, from International Application No. PCT/JP2018/011171, 8 sheets.

*Primary Examiner* — David M Fenstermacher
(74) *Attorney, Agent, or Firm* — Katten Muchin Rosenman LLP

(57) ABSTRACT

Provided is a pressing device for a toroidal continuously variable transmission that is capable of sufficiently supplying lubrication oil to all rollers inside a pocket, and is capable of suppressing the occurrence of fretting wear on the rolling surfaces of the rollers, a first cam surface and a second cam surface. An oil passage 28 is provided for supplying lubrication oil to the inside of each pocket 25 in the inside portion in the radial direction of a retainer 14 that holds a plurality of more than one roller 13 arranged in a row in the radial direction. The center axis $O_{29}$ of a discharge port 29 that is provided on an end portion on the downstream side of the oil passage 28 and that opens to the inside surface (Continued)

in the radial direction of the pocket 25 is inclined toward the front side in the rotational direction of the retainer 14 with respect to the center axis of the pocket 25.

10 Claims, 10 Drawing Sheets

(56) References Cited

U.S. PATENT DOCUMENTS

| | | | | |
|---|---|---|---|---|
| 2003/0106734 A1* | 6/2003 | Nagai | ................ | F16H 15/38 180/233 |
| 2003/0130087 A1* | 7/2003 | Imanishi | ................ | F16H 15/38 476/40 |
| 2003/0132051 A1* | 7/2003 | Nishii | ................ | F16H 15/38 180/364 |
| 2005/0043137 A1* | 2/2005 | Shinoda | ................ | F16H 15/38 476/40 |
| 2008/0269001 A1* | 10/2008 | Greenwood | ........ | F16H 61/6648 475/216 |
| 2008/0305920 A1* | 12/2008 | Nishii | ................ | F16H 15/38 476/42 |
| 2017/0114876 A1* | 4/2017 | Fukuda | ................ | F16D 1/09 |
| 2019/0078683 A1* | 3/2019 | Nakashima | ........... | F16H 61/02 |
| 2019/0101193 A1* | 4/2019 | Matsuda | ................ | F16H 15/38 |
| 2020/0063837 A1* | 2/2020 | Itagaki | ................ | F16H 57/049 |

FOREIGN PATENT DOCUMENTS

| | | | | |
|---|---|---|---|---|
| JP | 9-291999 A | 11/1997 | | |
| JP | 11-201251 A | 7/1999 | | |
| JP | 2005-54895 A | 3/2005 | | |
| JP | 2006-2882 A | 1/2006 | | |
| JP | 2006-194288 A | 7/2006 | | |
| JP | 2019090505 A | * 6/2019 | ......... | F16H 61/6649 |

* cited by examiner

PRESSING DEVICE FOR TOROIDAL CONTINUOUSLY VARIABLE TRANSMISSION

TECHNICAL FIELD

The present invention relates to a pressing device for a toroidal continuously variable transmission installed in generators such as aircraft generators and the like, various kinds of industrial machinery such as pumps and the like, and vehicles including automobiles, construction machinery and the like.

BACKGROUND ART

A toroidal continuously variable transmission comprises an input-side disk and an output-side disk that are coaxially arranged to each other and that rotate relative to each other, and a plurality of power rollers that are held between these disks, and the toroidal continuously variable transmission is configured so that power is transmitted from the input-side disk to the output-side disk via the power rollers. In a toroidal continuously variable transmission, it is possible to adjust the transmission ratio between the input-side disk and the output-side disk by changing the inclination angle of the power rollers.

During operation of a toroidal continuously variable transmission, an oil film of traction oil is formed on traction portions that are portions of rolling contact between a side surface in the axial direction of the input-side disk and a peripheral surface of the respective power rollers and between a side surface in the axial direction of the output-side disk and the peripheral surface of the respective power rollers. Power is transmitted from the input-side disk to the output-side disk via this oil film. In a toroidal continuously variable transmission, a pressing device is provided for pressing the input-side disk and the output-side disk in directions toward each other so that the transmission of power via the oil film of traction oil can be reliably performed.

As a pressing device for a toroidal continuously variable transmission, JP H11-201251(A) discloses a loading cam type pressing device for mechanically generating a pressing force that is proportional to the magnitude of the transmission torque. The loading cam type pressing device includes a first cam surface that is provided on the side surface in the axial direction of a disk-shaped cam plate, a second cam surface that is provided on the side surface in the axial direction of a disk that faces the first cam surface in the axial direction, and a plurality of rollers held between the first cam surface and the second cam surface. The plurality of rollers are rollably held inside a plurality of rectangular-shaped pockets located at a plurality of locations in the circumferential direction of a retainer, with two or more rollers of the plurality of rollers being arranged in a row in the radial direction of the cam plate inside each of the pockets.

During operation of the loading cam type pressing device, the rollers ride up on convex portions of the first cam surface and the second cam surface, whereby the space in the axial direction between the first cam surface and the second cam surface increases. As a result, the first disk on which the second cam surface is provided (for example, the input-side disk) is pressed toward the second disk (for example, the output-side disk) that faces the first disk, and the surface pressure of the traction portion is maintained.

During operation of a loading cam type pressing device, or in other words, during generation of a pressing force, the rolling surfaces of the rollers are held between the first cam surface and the second cam surface with a strong force. When a toroidal continuously variable transmission is operated at a constant gear ratio, the amount that the rollers ride up on the convex portions of the first cam surface and the second cam surface becomes fixed, and the rollers stop rolling. Therefore, when minute slipping occurs between the rolling surfaces of the rollers and the first and second cam surfaces, fretting wear easily occurs on the rolling surfaces of the rollers and the first cam surface and second cam surface. In order to suppress the occurrence of fretting wear, it is important that lubrication oil be sufficiently supplied to the contact portions of the rolling surfaces of the rollers and first cam and second cam surfaces. In regard to this, JP 2006-002882(A), for example, discloses a structure in which an oil hole of which the end section on the downstream side opens up to the inside surface in the radial direction of the respective pockets is provided in the inside portion in the radial direction of the retainer.

PRIOR ART DOCUMENTS

Patent Literature

Patent Literature 1: JP H11-201251(A)
Patent Literature 2: JP 2006-002882(A)

SUMMARY OF INVENTION

Technical Problem to be Solved by the Invention

In the structure disclosed in JP 2006-002882(A), however, the effect of the Coriolis force acting on the lubrication oil that is discharged from the oil holes is not taken into consideration. Therefore, there is a possibility that lubrication oil may not be sufficiently supplied to the contact portions of the rolling surfaces of the rollers, and the first and second cam surfaces. In the structure disclosed in JP 2006-002882(A), a plurality of rollers are held inside the pockets, with two or more rollers of the plurality of rollers arranged in a row in the radial direction of the retainer inside each of the pockets. Therefore, it is particularly difficult to sufficiently supply lubrication oil to rollers that are arranged on the outside in the radial direction of the pockets.

Taking into consideration the situation described above, an object of the present invention is to provide a pressing device for toroidal continuously variable transmission having a structure in which lubrication oil may be sufficiently supplied to the rollers inside the pockets, and generation of fretting wear on the rolling surfaces of the rollers and on the first cam surface and second cam surface may be suppressed.

Means for Solving the Problems

The pressing device for a pressing device for toroidal continuously variable transmission includes a cam plate, a disk, a retainer, and a plurality of rollers.

The cam plate has a first cam surface that is uneven in the circumferential direction on one side in the axial direction The disk is one of an input-side disk and an output-side disk arranged to sandwich a power roller, and has a toroidal curved surface with an arc-shaped cross section on one side in the axial direction, and a second cam surface on the other side in the axial direction facing the first cam surface and that is uneven in the circumferential direction.

The retainer is arranged between the first cam surface and the second cam surface and has pockets arranged at a plurality of locations in the circumferential direction, the respective pockets having a center axis arranged in the radial direction.

The plurality of rollers are rollably held inside the pockets, with one or more rollers of the rollers being held inside the respective pockets. With the rollers being held inside the pockets, the rollers are arranged so that the center axis of the respective rollers is along the radial direction and is substantially parallel to the center axis of the respective pockets.

The retainer has one or more oil passages on the inside or on the surface thereof for allowing lubrication oil to pass through. One or more discharge ports are provided on the end portion on the downstream side of the respective oil passages and open to the inside of the respective pockets, and the respective discharge ports discharge lubrication oil on the front side in the rotational direction of the retainer than the center axis of the respective pockets.

The respective discharge ports can open to the inside surface in the radial direction of the respective pockets, and the center axis of the respective discharge ports can be inclined toward the front side in the rotational direction with respect to the center axis of the respective pockets.

The respective discharge ports can be arranged on the front side in the rotational direction on the inside surface in the radial direction of the respective pockets than the center axis of the respective pockets.

Two or more rollers of the rollers can be arranged in a row in the radial direction of the retainer inside the respective pockets.

Alternatively, the respective discharge ports can open to the side surface on the front side in the rotational direction of the side surfaces in the circumferential direction of the respective pockets. In this case as well, two or more rollers of the rollers can be arranged in a row in the radial direction of the retainer inside the respective pockets, and the respective discharge ports can face the rolling surface of at least one roller arranged on the innermost side in the radial direction of the retainer of the two or more rollers held inside the respective pockets in the circumferential direction of the retainer. Furthermore, two or more discharge ports can be provided on the respective pockets and can face the rolling surfaces of at least two rollers including the one roller arranged on the innermost side in the radial direction of the retainer of the two or more rollers held inside the respective pockets in the circumferential direction of the retainer.

The discharge speed of the lubrication oil discharged from the respective discharge ports can be changed according to the rotational speed of the retainer. More specifically, the discharge speed can be increased as the rotational speed increases, and the discharge speed can be decreased as the rotational speed decreases.

Effect of the Invention

With the pressing device for toroidal continuously variable transmission of the present invention, lubrication oil can be easily and sufficiently supplied to the rollers inside the pockets, and it is possible to suppress the occurrence of fretting wear on the rolling surfaces of the rollers, the first cam surface, and the second cam surface.

In other words, with the pressing device according to the present invention, the lubrication oil can be discharged from a discharge port of an oil passage provided in the retainer on the front side in the rotational direction of the retainer than the center axis of the pocket that rollably holds the rollers. Therefore, it is possible to cause the lubrication oil to move in the circumferential direction across the center axis of the rollers held in the pocket by utilizing the Coriolis force that acts as the retainer rotates. Therefore, the amount of lubrication oil that can be supplied to the rollers held inside the pocket, and particularly the rollers arranged on the outside in the radial direction of the retainer, can be made sufficiently large.

In this way, with the present invention, it is possible to easily and sufficiently supply lubrication oil to the rollers inside the pocket. As a result, the lubricated state of the contact portions between the rolling surfaces of the rollers and the first cam surface and the second cam surface can be improved, and the occurrence of fretting wear can be suppressed.

MODES FOR CARRYING OUT THE INVENTION

First Example

Figure 1:
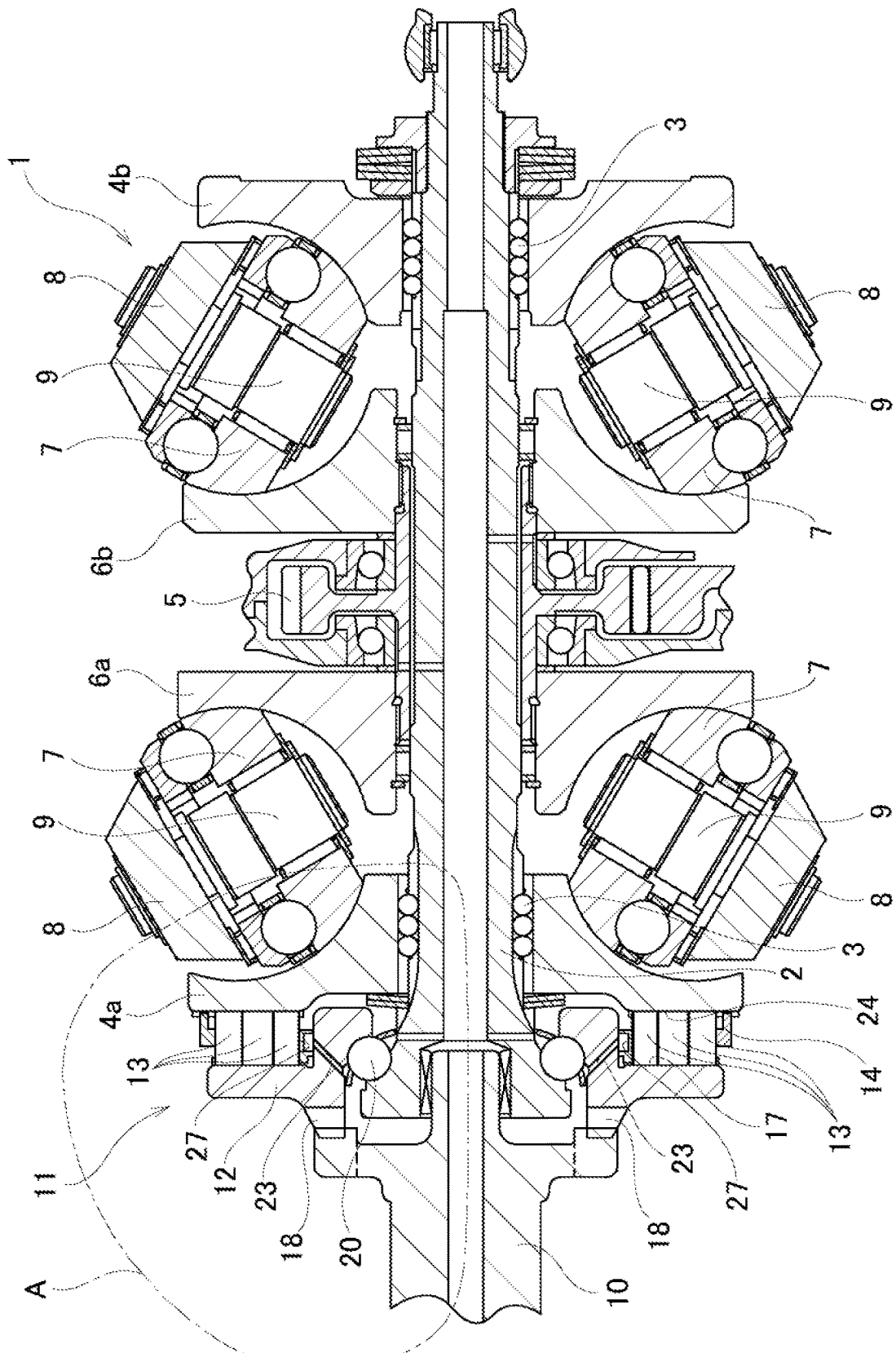
FIG. 1 is a cross-sectional view of a first example of a toroidal continuously variable transmission according to an embodiment of the present invention.
Figure 2:
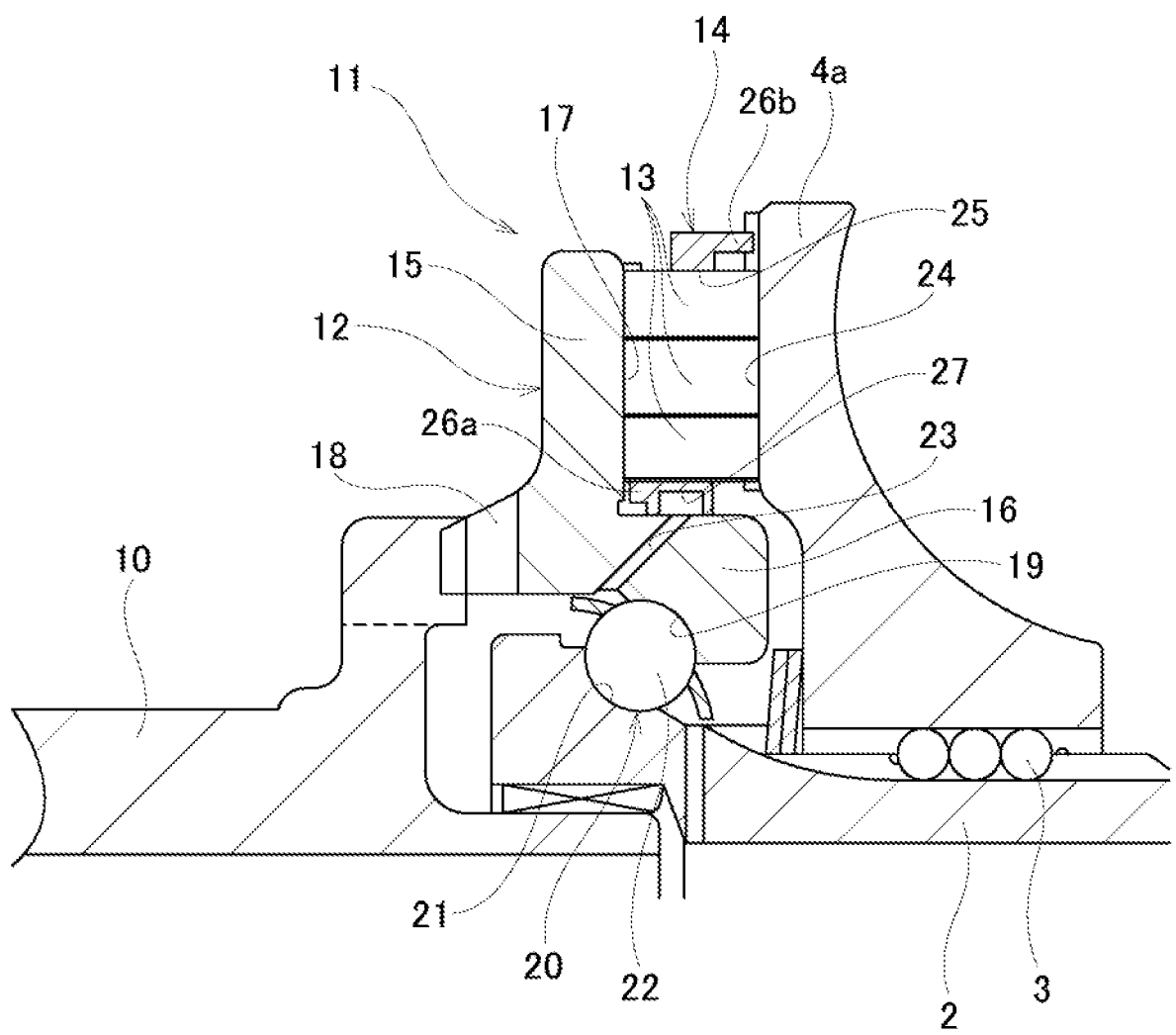
FIG. 2 is an enlarged view of portion A in FIG. 1.
Figure 3:
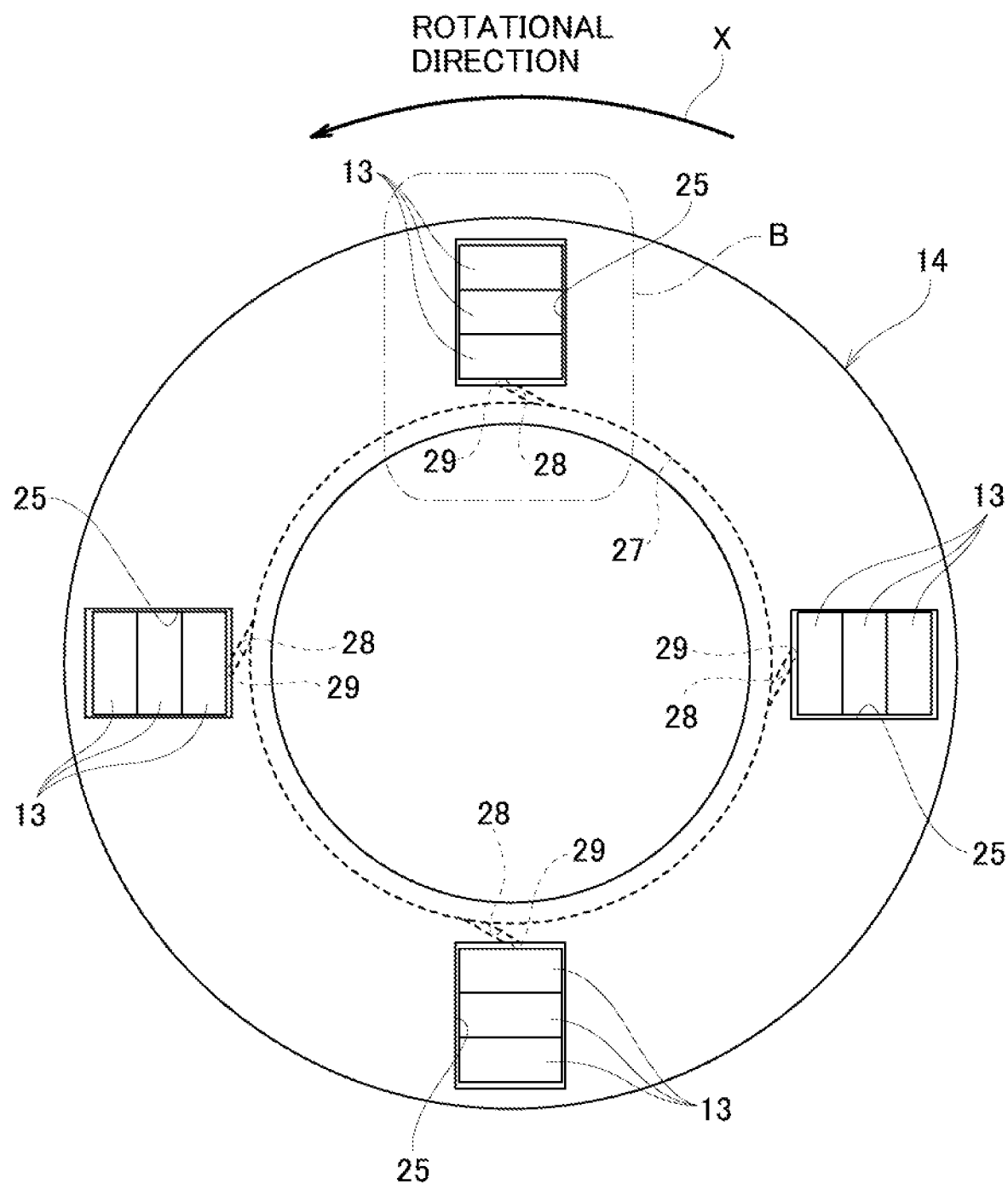
FIG. 3 is a schematic view of the removed retainer and rollers of the toroidal continuously variable transmission of the present invention as seen from the axial direction of the retainer.
Figure 4:
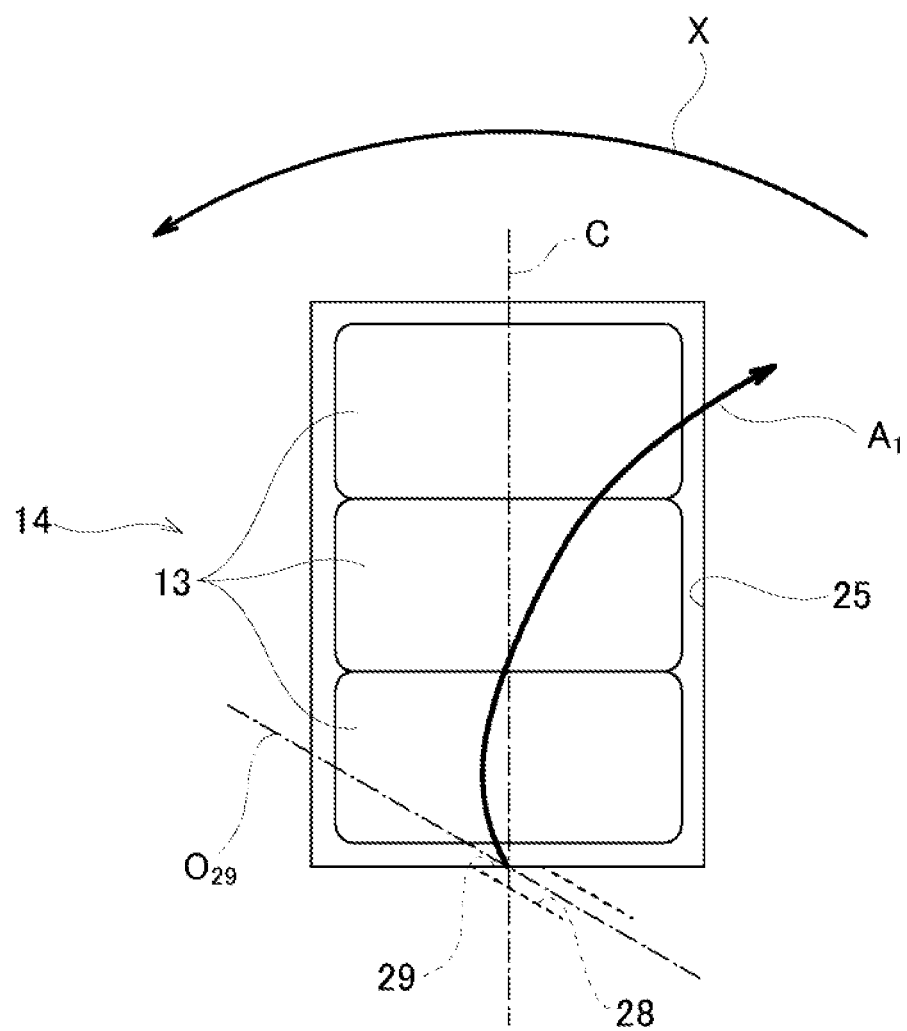
FIG. 4 is an enlarged view of a portion corresponding to portion B in FIG. 3.

FIG. 1 to FIG. 4 illustrate a first example of an embodiment of the present invention. The toroidal continuously variable transmission 1 is a double cavity type and includes a pair of outside disks 4a, 4b and inside disks 6a, 6b, between which two cavities are formed in which the power rollers 7 are arranged. The pair of outside disks 4a, 4b is supported around both end portions in the axial direction of the input shaft 2 via ball splines 3 so as to be able to rotate coaxially and synchronously with each other. The outside disks 4a and 4b have toroidal curved surfaces that are concave surfaces having an arc-shaped cross section on the inside in the axial direction facing each other. However, the present invention can also be applied to a pressing device for a so-called single-cavity type toroidal continuously variable transmission that includes one input-side disk and one output-side disk.

A gear 5 is supported around a middle portion in the axial direction of the input shaft 2 so as to be able to rotate relative to the input shaft 2. At both end portions of the cylindrical portion provided at the center portion of the gear 5, the inside disks 6a, 6b are supported by spline engagements so as to be able to rotate in synchronization with the gear 5. The inside disks 6a, 6b have toroidal curved surfaces that are concave surfaces having an arc-shaped cross section on the outside in the axial direction facing the outside disks 4a, 4b in the axial direction.

A plurality of power rollers 7 are respectively held between the toroidal curved surfaces on the inside in the axial direction of the outside disks 4a, 4b and the toroidal curved surfaces on the outside in the axial direction of the inside disks 6a, 6b. Each of the power rollers 7 is rotatably supported on the inside surface of a trunnion 8 via a support shaft 9 and a plurality of rolling bearings. The trunnions 8 are each capable of pivotal displacement about pivots (not illustrated) provided at both end portions in the longitudinal direction (front and back direction in FIG. 1). The operation of causing the trunnion 8 to pivot is performed by causing the trunnion 8 to move in the axial direction of the pivot by an actuator (not illustrated).

During operation of the toroidal continuously variable transmission 1, the input shaft 2 is rotated and driven by the drive shaft 10 connected to the power source by rotating and driving the outside disk 4a (left side in FIG. 1) of the outside disks 4a, 4b via the loading cam type pressing device 11. In this example, the pair of outside disks 4a, 4b correspond to the input-side disks that input power, and the inside disks 6a, 6b correspond to the output-side disks that output power. However, the present invention may also be applied to construction in which the inside disks 6a, 6b are input-side disks and the pair of outside disks 4a, 4b are output-side disks.

The pressing device 11 includes a cam plate 12, the outside disk 4a of the pair of outside disks 4a, 4b, a plurality of rollers 13, and a retainer 14.

The cam plate 12 is configured so as to have a crank shape cross section and an overall annular shape, and is supported around the base end portion (the left end in FIG. 1) of the input shaft 2. The cam plate 12 includes an annular portion 15 provided on the outside portion in the radial direction and a cylindrical portion 16 provided on the inside portion in the radial direction. The annular portion 15 has a drive-side cam surface 17 on one side in the axial direction, or in other words the inside surface in the axial direction (right-side surface in FIG. 1 and FIG. 2), where this drive-side cam surface 17 is uneven in the circumferential direction and corresponds to a first cam surface; and has a plurality of protruding pieces 18 on the other side in the axial direction, or in other words, on the inside portion in the radial direction of the outside surface in the axial direction (left-side surface in FIG. 1 and FIG. 2), where these protruding pieces protrude in the axial direction. The protruding pieces 18 engage with the tip-end portion of the drive shaft 10, enabling the rotation of the drive shaft 10 to be transmitted to the cam plate 12.

The cylindrical portion 16 has an angular type outer-ring raceway 19 on the inner circumferential surface. An angular type ball bearing 20 is configured by the outer-ring raceway 19, an angular type inner-ring raceway 21 formed on the outer circumferential surface of the base end portion of the input shaft 2, and a plurality of balls 22 rollably arranged between the outer-ring raceway 19 and the inner-ring raceway 21. The cam plate 12 is rotatably supported at the base end portion of the input shaft 2 by the angular ball bearing 20, and a thrust load acting on the cam plate 12 can be supported by the input shaft 2. The cylindrical portion 16 has oil holes 23 at a plurality of locations in the circumferential direction, and these oil holes 23 penetrate through in the radial direction, allowing lubrication oil (traction oil) to pass through. The oil holes 23 may be provided, for example, at four locations at equal intervals in the circumferential direction of the cylindrical portion 16. The oil hole 23 supply lubrication oil that is supplied to the ball bearing 20 through the inside of the input shaft 2 to the inner-diameter side of the retainer 14.

The outside disk 4a is supported around a portion near the base end of the input shaft 2 via a ball splines 3 so as to be able to rotate in synchronization with the input shaft 2, and so as to be able to move in the axial direction with respect to the input shaft 2. The outside disk 4a, as described above, has the toroidal curved surface on the inside in the axial direction that is the one side in the axial direction, and has a driven-side cam surface 24 on the other side in the axial direction, or in other words, the outside surface in the axial direction (rear surface, left-side surface in FIG. 1 and FIG. 2) facing a drive-side cam surface 17, where this driven-side cam surface 24 corresponds to the second cam surface, and is uneven in the circumferential direction.

The retainer 14 has an overall annular plate shape, and is arranged between the drive-side cam surface 17 and the driven-side cam surface 24. The retainer 14 has pockets 25 at four locations at equal intervals in the circumferential direction of the middle portion in the radial direction, where the center axis of each of these pockets 25 is along the radial direction of the retainer 14, and the shape of the opening as seen from the axial direction is rectangular. The number of pockets 25 is arbitrary, and the pockets 25 may be provided at two or more locations in the circumferential direction of the retainer 14. Preferably, the pockets 25 are provided at three to five locations at equal intervals in the circumferential direction of the middle portion in the radial direction of the retainer 14.

The retainer 14 has protruding portions 26a, 26b on the inner circumferential edge portion and outer circumferential edge portion and that protrude in opposite directions from each other in the axial direction. By engaging the protruding portion 26a with the drive-side cam surface 17 and engaging the protruding portion 26b with the driven-side cam surface 24, the retainer 14 is positioned in the axial direction. The inner circumferential surface of the retainer 14 closely faces the outer circumferential surface of the cylindrical portion 16 of the cam plate 12, or in other words, by fitting the inner circumferential surface of the retainer 13 around the outer circumferential surface of the cylindrical portion 16 with a clearance fit, the retainer 14 can be positioned in the radial direction of the retainer 14.

Each of the plurality of rollers 13 is formed in a short cylindrical shape having a short dimension in the axial direction compared with the diameter dimension. In this example, the rollers 13 are rollably held inside the pockets 25 that are formed at four locations at equal intervals in the circumferential direction of the retainer 14, with three rollers of the rollers are arranged in a row in the radial direction of the retainer 14 so that the center axes of the three rollers coincide with each other. The center axes of the rollers 13 arranged inside the pockets 25 are along the radial direction and are substantially parallel to and preferably substantially coincide with the center axis of the respective pockets 25.

The rolling surface of the respective rollers 13 held by the retainer 14 comes in rolling contact with the drive-side cam surface 17 and the driven-side cam surface 24, and in this state, the rollers 13 are held between the drive-side cam surface 17 and the driven-side cam surface 24.

The number of rollers 13 arranged in each pocket 25 is arbitrary, and one roller 13 may be arranged inside each of the pockets 25 so that the center axis thereof is along the radial direction, and may be arranged so as to be substantially parallel to or coinciding with the center axis of the respective pockets 25. Alternatively, two or more (two to four) rollers of the rollers 13 may be arranged inside the respective pockets 25, where the rollers 13 are arranged in a row in the radial direction of the retainer 14. By providing two or more rollers 13 inside each of the pockets 25 as in this example, these rollers 13 can each roll independently of each other, so it becomes possible to absorb the speed difference between the inner-diameter side and the outer-diameter side of the drive-side cam surface 17 and the driven-side cam surface 24.

In this example, in order to sufficiently supply the lubrication oil to the contact portions between the rolling surfaces of the rollers 13 and the drive-side cam surface 17 and the driven-side cam surface 24, the retainer 14 has an oil retaining concave portion 27 and a plurality of oil passages 28.

The oil retaining concave portion 27 is provided over the entire inner circumferential surface of the retainer 14 so as to radially face the oil hole 23 that is opened on the outer circumferential surface of the cylindrical portion 16 of the cam plate 12. In other words, the opening portion on the outside in the radial direction, which is an end portion on the downstream side of the respective oil holes 23 opens at the bottom portion of the oil retaining concave portion 27. The oil retaining concave portion 27 has a width dimension so as to always be able to face in the radial direction the opening portion on the outside in the radial direction of the oil hole 23 regardless position where the rollers 13 ride up on the drive-side cam surface 17 and the driven-side cam surface 24.

The oil passage 28 is configured by a through hole provided inside of a portion in the inside portion in the radial direction of the retainer 14 which is located on the outside in the radial direction than a portion thereof where the oil retaining concave portion 27 is provided. The oil passage 28 is inclined in a direction toward the front side in the rotational direction of the retainer 14 (direction of arrow X in FIG. 3 and FIG. 4) during operation of the toroidal continuously variable transmission 1 going toward the outside in the radial direction, which is the downstream side. The opening on the inside in the radial direction of the oil passage 28, which is the end portion on the upstream side, opens to the bottom portion of the oil retaining concave portion 27, and the discharge port 29, which is the end portion on the downstream side, opens to the central portion in the circumferential direction of the inside surface in the radial direction of the pocket 25. Therefore, the center axis $O_{29}$ of the discharge port 29 (center axis of the oil passage 28) is inclined toward the front side in the rotational direction of the retainer 14 with respect to the central axis C of the pocket 25 arranged in the radial direction. The inclination angle of the center axis $O_{29}$ of the discharge port 29 with respect to the center axis C of the pocket 25 is preferably no less than 2 degrees and no more than 60 degrees, and more preferably no less than 2 degrees and no more than 30 degrees. In this example, this inclination angle is approximately 60 degrees.

In this example, the oil passage 28 is provided inside the retainer 14, however, alternatively, as long as the oil retaining concave portion 27 and the pocket 25 are connected, the oil passage 28 may be configured by forming a concave groove in the surface of one or both of the side surfaces in the axial direction of the retainer 14.

During operation of the toroidal continuously variable transmission 1, the drive shaft 10 rotates and drives the cam plate 12, whereby the rollers 13 are strongly held between the drive-side cam surface 17 and the driven-side cam surface 24, and the rotation of the cam plate 12 is transmitted to the outside disk 4a via the rollers 13. As a result, the pair of outside disks 4a, 4b that are supported by both end portions in the axial direction of the input shaft 2 rotate in synchronization while being pressed in a direction toward each other, and furthermore, the rotation of the outside disks 4a, 4b is transmitted to the inside disks 6a, 6b via the power rollers 7, and output from the gear 5.

In this example, it is possible to sufficiently supply lubrication oil to all of the rollers 13 on inside of the pockets 25, and the generation of fretting wear on the rolling surfaces of the rollers 13, the drive-side cam surface 17 and the driven-side cam surface 24 can be suppressed.

In other words, the lubrication oil that is supplied into the oil retaining concave portion 27 through the oil hole 23 of the cam plate 12, after flowing outward in the radial direction through the oil passage 28, is discharged from the discharge port 29 that is opened to the center portion in the circumferential direction of the inside surface in the radial direction of the pocket 25. In this example, the center axes $O_{29}$ of the discharge ports 29 are inclined toward the front side in the rotational direction of the retainer 14 with respect to the center axes C of the respective pockets 25 arranged in the radial direction, so lubrication oil can be discharged further on the front side in the rotational direction of the retainer 14 than the center axis C of the pocket 25. Therefore, as in the case of the movement trajectory of the lubrication oil indicated by arrow $A_1$ in FIG. 4, the movement direction of the lubrication oil is gradually changed in a direction toward the center axis C of the pocket 25 by utilizing the Coriolis force that acts as the retainer 14 rotates, and the lubrication oil can be moved across the center axis C of the pocket 25 at a location between the roller 13 on the inside in the radial direction and the roller 13 in the middle in the radial direction of the rollers held inside the pocket 25. As a result, when the lubrication oil passes through the inside of the pocket 25 in the radial direction, the lubrication oil can move so as to pass over all of the rollers 13 inside the pocket 25.

Figure 11:
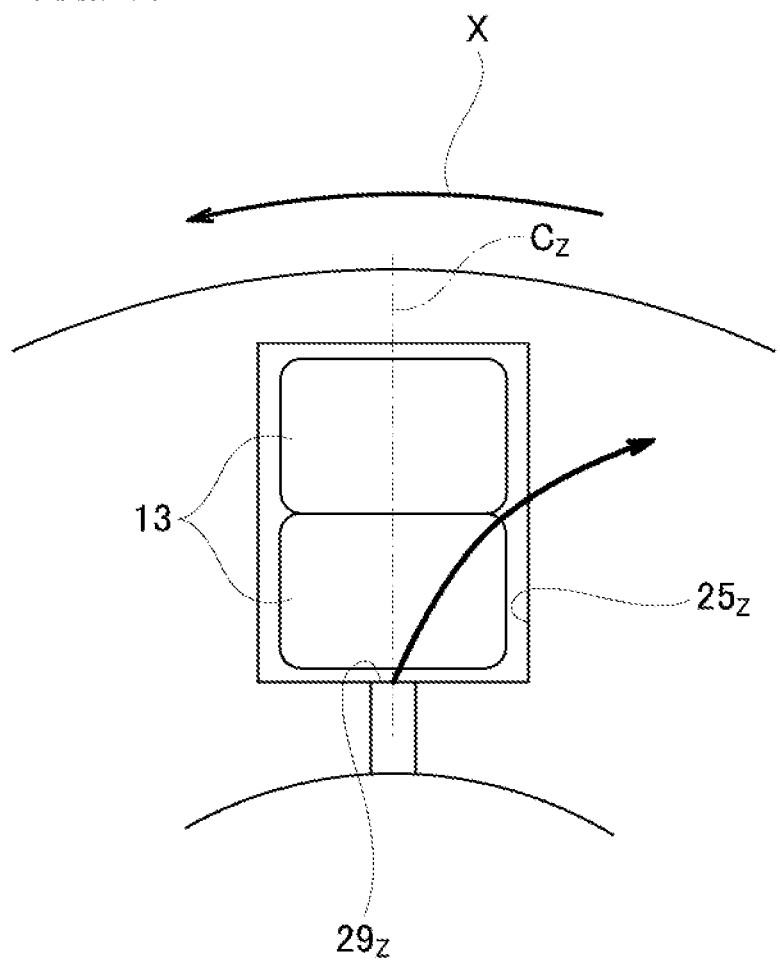
FIG. 11 illustrates conventional construction in which lubrication oil is discharged from the discharge port provided in the center portion in the circumferential direction of a pocket in the direction of the center axis of the pocket.

Therefore, compared to the conventional construction as illustrated in FIG. 11, for example, in which lubrication oil is supplied from the discharge port 29z that opens in the center portion in the circumferential direction of the inside surface in the radial direction of the pocket 25z that coincides with the direction of the center axis $C_z$ of the pocket 25z and the lubrication oil moves in a direction going away from the center axis $C_z$ of the pocket 25z immediately after being discharged, it is possible to increase the amount of lubrication oil that is supplied to the rollers 13 inside the pocket 25, particularly to the roller 13 arranged in the middle section in the radial direction and the roller 13 arranged on the outside in the radial direction. As described above, with the toroidal continuously variable transmission 1 of this embodiment, lubrication oil can be easily supplied sufficiently to all of the rollers 13 inside the pocket 25, the lubrication state at the contact portions between the rolling surfaces of the rollers 13, the drive-side cam surface 17 and the driven-side cam surface 24 can be improved, and the occurrence of fretting wear can be suppressed.

Second Example

Figure 5:
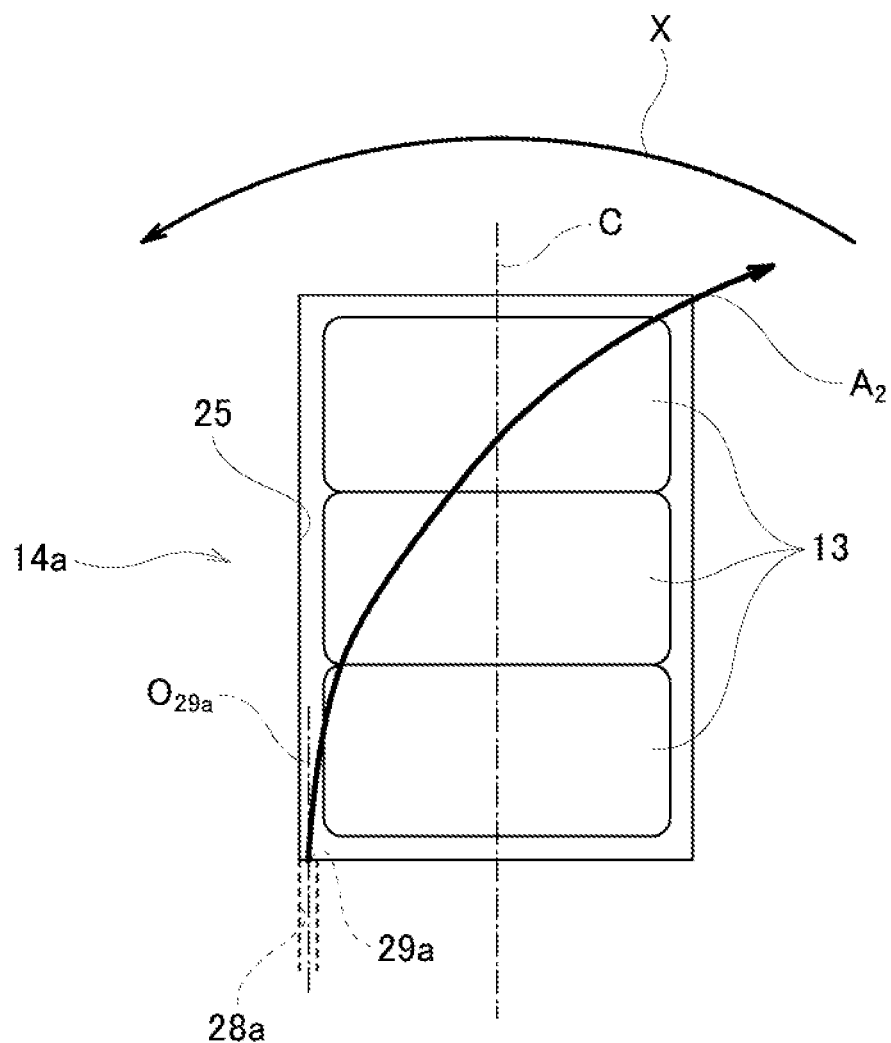
FIG. 5 is a view corresponding to FIG. 4 and illustrates a second example of a toroidal continuously variable transmission of an embodiment of the present invention.

FIG. 5 illustrates a second example of an embodiment of the present invention. In this example, the position of the opening of the discharge port 29a, which is the end portion on the downstream side of the oil passage 28a, provided on the inside portion in the radial direction of the retainer 14, and the inclined state of the discharge port 29a with respect to the center axis C of the pocket 25 differ from the retainer 14 in the first example of an embodiment.

In other words, the discharge port 29a opens to the front end portion in the rotational direction of the retainer 14 on the inside surface in the radial direction of the pocket 25. Therefore, in a state where the center axis C of the pocket 25 and the center axis of the rollers 13 inside the pocket 25 coincide with each other, the discharge port 29a is located at a position shifted in the circumferential direction from the rollers 13, or in other words, is located at a position that does not face the end surfaces in the axial direction of the rollers 13. The center axis $O_{29a}$ of the discharge port 29a (center axis of the oil passage 28a) is not inclined with respect to the center axis C of the pocket 25, and is arranged so as to be parallel to the center axis C of the pocket 25.

In this example, when lubrication oil passes in the radial direction through the inside of the pocket 25, it is possible to cause the lubrication oil to move so as to cross the center axis C of the pocket 25 at the middle position in the axial direction of the roller 13 on the outside in the radial direction of the rollers 13 arranged inside the pocket 25 as the movement trajectory of lubrication oil indicated by arrow A2 in FIG. 5. Therefore, it is possible to cause the lubrication oil to move so as to pass over all of the rollers 13 inside the pocket 25. The other configurations and operational effects are the same as those of the first example.

Third Example

Figure 6:
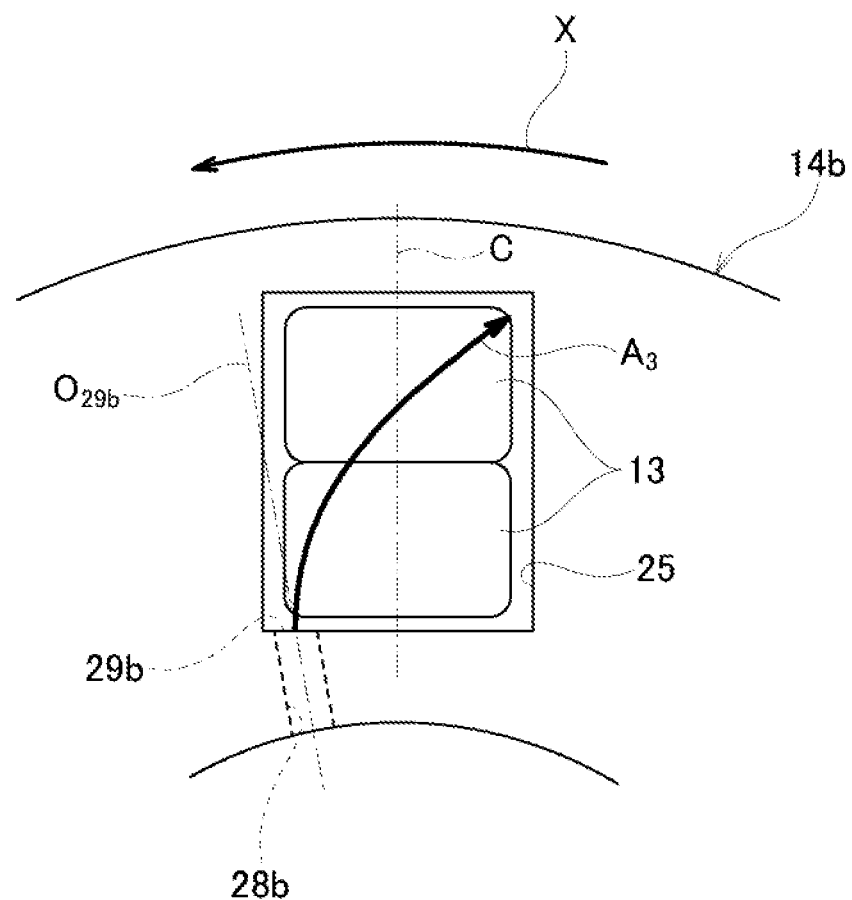
FIG. 6 is a view corresponding to FIG. 4 and illustrates a third example of a toroidal continuously variable transmission of an embodiment of the present invention.

FIG. 6 illustrates a third example of an embodiment of the present invention. In this example, the number of rollers 13 arranged in a row in the radial direction of the retainer 14b inside each of the pockets 25 is two. In addition, in the retainer 14b of this example, configuration obtained by combining the inclined state of the discharge port 29 of the oil passage 28 in the retainer 14 of the first example, and the position of the opening of the discharge port 29a of the oil passage 28a in the retainer 14a of the second example is used.

In other words, the discharge port 29b of the oil passage 28b provided in the inside portion in the radial direction of the retainer 14b opens to the front end portion in the rotational direction of the retainer 14b on the inside surface in the radial direction of the pocket 25. Moreover, the center axis $O_{29b}$ of the discharge port 29b is inclined toward the front side in the rotational direction of the retainer 14b with respect to the center axis C of the pocket 25 (inclined at about 10 degrees in the example in FIG. 6).

In this example, as in the movement trajectory of the lubrication oil indicated by arrow $A_3$ in FIG. 6, it is possible to cause the lubrication oil to move so as to cross the center axis C of the pocket 25 at the middle position in the axial direction of the roller 13 on the outside in the radial direction of the rollers 13 arranged inside the pocket 25. Therefore, it is possible to cause the lubrication oil to move so as to pass over all of the rollers 13 inside each of the pockets 25. The other configurations and operational effects are the same as those of the first and second examples.

Fourth Example

Figure 7:
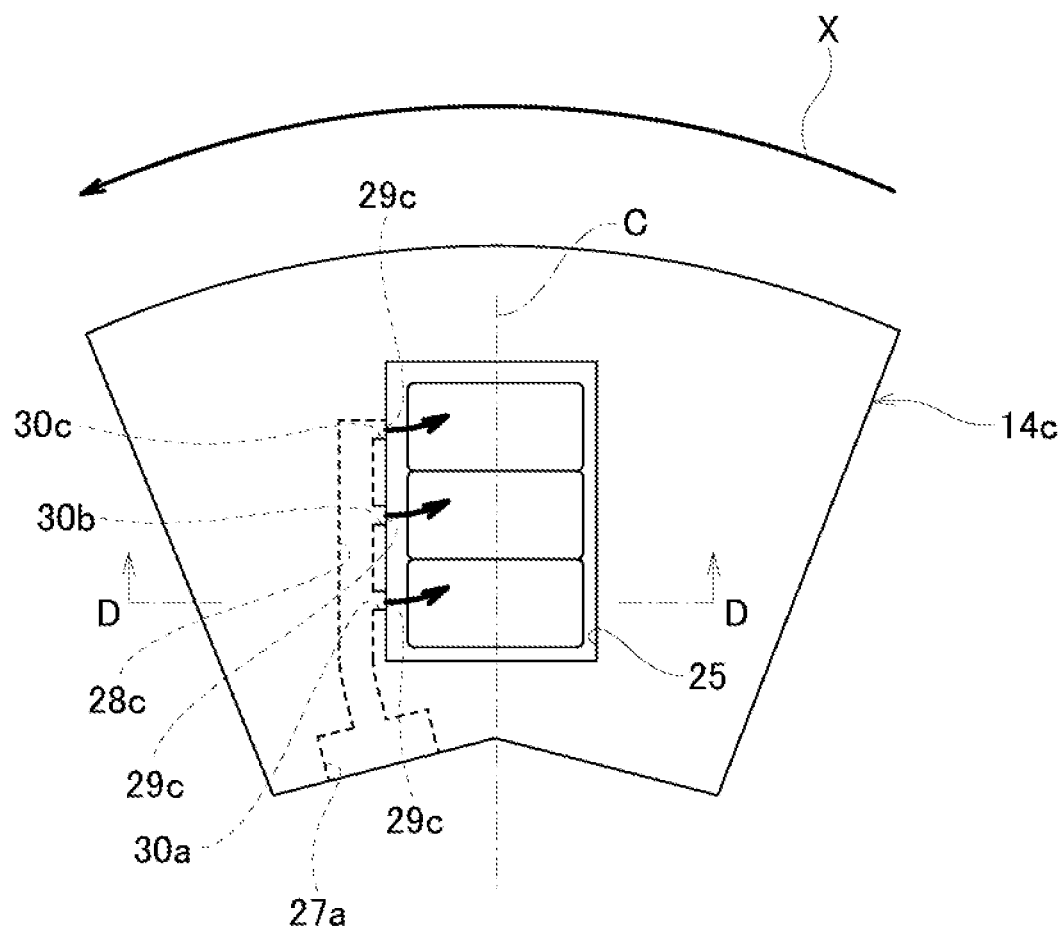
FIG. 7 is a view corresponding to FIG. 4 and illustrates a fourth example of a toroidal continuously variable transmission of an embodiment of the present invention.
Figure 8:
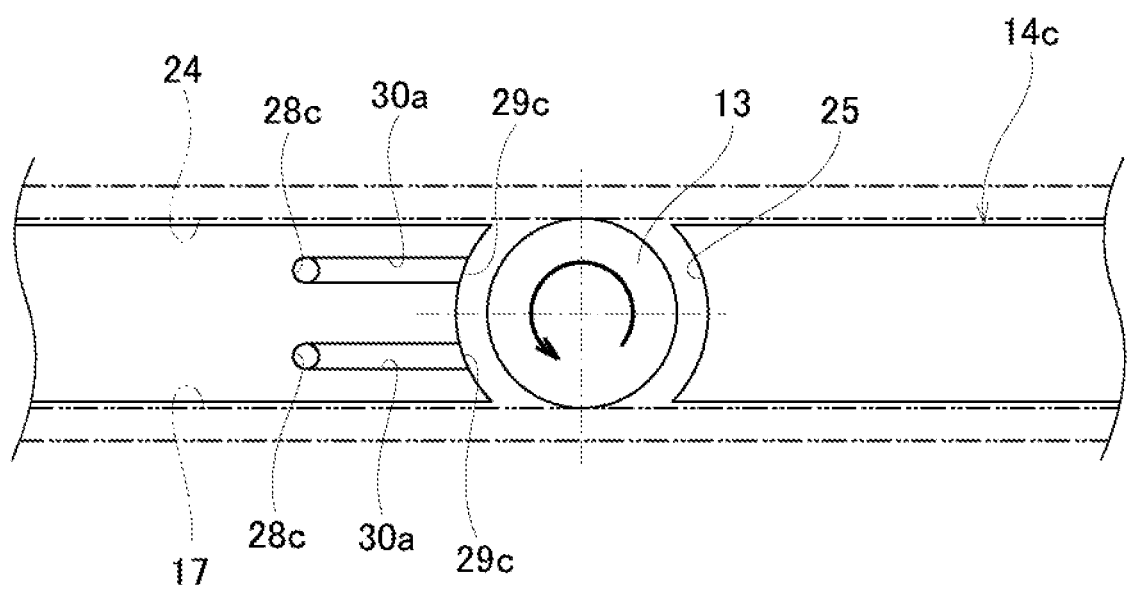
FIG. 8 is a view corresponding to section D-D in FIG. 7.

FIG. 7 and FIG. 8 illustrate a fourth example of an embodiment of the present invention. In this example, the configuration of the oil retaining concave portion 27a and the oil passage 28c (discharge port 29c) of the retainer 14c differs from that of the first thru third examples.

In this example, a plurality of oil retaining concave portions 27a is provided on the inner circumferential surface of the retainer 14c so as to be separated by equal intervals in the circumferential direction. More specifically, the oil retaining concave portions 27a are provided at positions on the inner circumferential surface of the retainer 14c where the phase in the circumferential direction is shifted a little toward the front side in the rotational direction of the retainer 14c from the respective pockets 25.

A pair of oil passages 28c, the upstream end section of which opens to the bottom surface of the respective oil retaining concave portions 27a, are provided further on the front side from the respective pockets 25 in the rotational direction of the retainer 14c. The pair of oil passages 28c is provided so as to be separated from each other in the axial direction of the retainer 14c, and is arranged substantially parallel to the center axis C of the respective pockets 25. An inner-diameter side branch hole 30a, a middle branch hole 30b and an outer-diameter side branch hole 30c that branch in the circumferential direction are provided in portions of the oil passage 28 that are aligned with the rollers 13 that are arranged inside the respective pockets 25 in the radial direction of the retainer 14c. The opening portions of the inner-diameter side branch hole 30a, the middle branch hole 30, and the outer-diameter branch hole 30c respectively function as discharge ports 29c. Therefore, the respective discharge ports 29a, 29b, 29c open to the side surface in the circumferential direction of the respective pockets 25 that is positioned on the front side in the rotational direction of the retainer 14c, and face the rolling surfaces of the roller 13 on the inside in the radial direction, the roller 13 in the middle in the radial direction, and the roller 13 on the outside in the radial direction, in the circumferential direction of the retainer 14c respectively. The retainer 14c of this example can be formed by overlapping a plurality of plate members in which grooves or spaces that will form the oil passages 28c that are formed by injection molding. Alternatively, the oil passages 28c can be formed by forming through holes that penetrate the retainer 14c in the radial direction, and then covering the outer end portions in the radial direction of the through holes with a plug or the like.

In this example, the number of discharge ports 29c provided is the same number as the rollers 13 that are arranged inside of the respective pockets 25. In other words, a dedicated discharge port 29c is provided for each roller 13. Therefore, the lubrication oil can be sufficiently supplied to the contact portions between the rolling surfaces of the rollers 13 and the drive-side cam surface 17 and the driven-side cam surface 24. However, in the present invention, the discharge port 29c can be made to face at least the rolling surface of the roller 13 that is arranged the innermost in the radial direction of the retainer 14c of the rollers 13 that are arranged inside the respective pockets 25 in the circumferential direction of the retainer 14c. In addition, in this example, a pair of oil passages 28c is provided so as to be separated from each other in the axial direction of the retainer 14c, however, the number of oil passages 28c may be one, or as long as there is extra width in the axial direction of the retainer 14c, it is possible to provide three or more oil passages 28c, and these forms are also within the scope of the present invention. The other configurations and operational effects are the same as those of the first example.

Fifth Example

Figure 9:
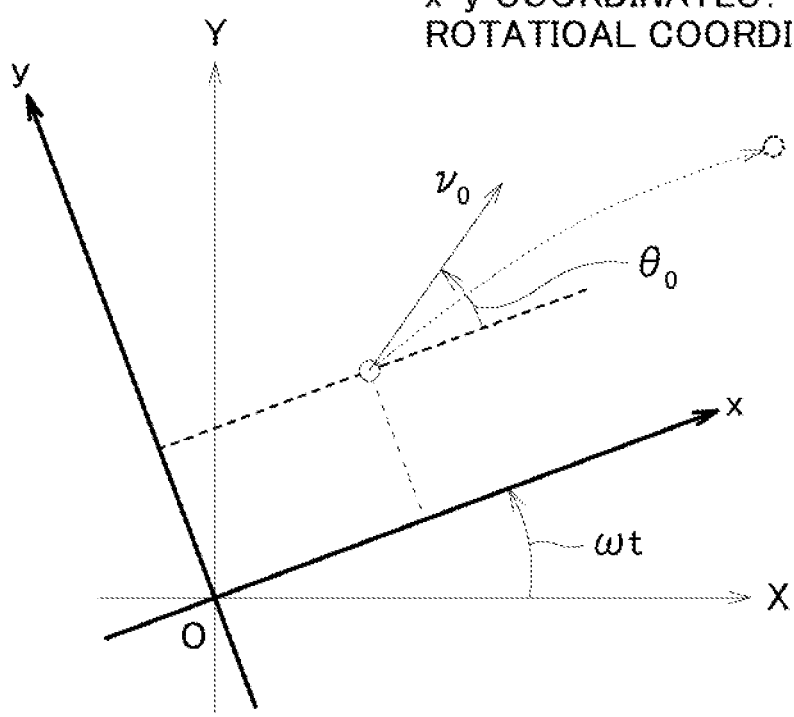
FIG. 9 shows two-dimensional polar coordinates used for obtaining an equation of motion of the lubrication oil for a fifth example of an embodiment of the present invention.
Figure 10A:
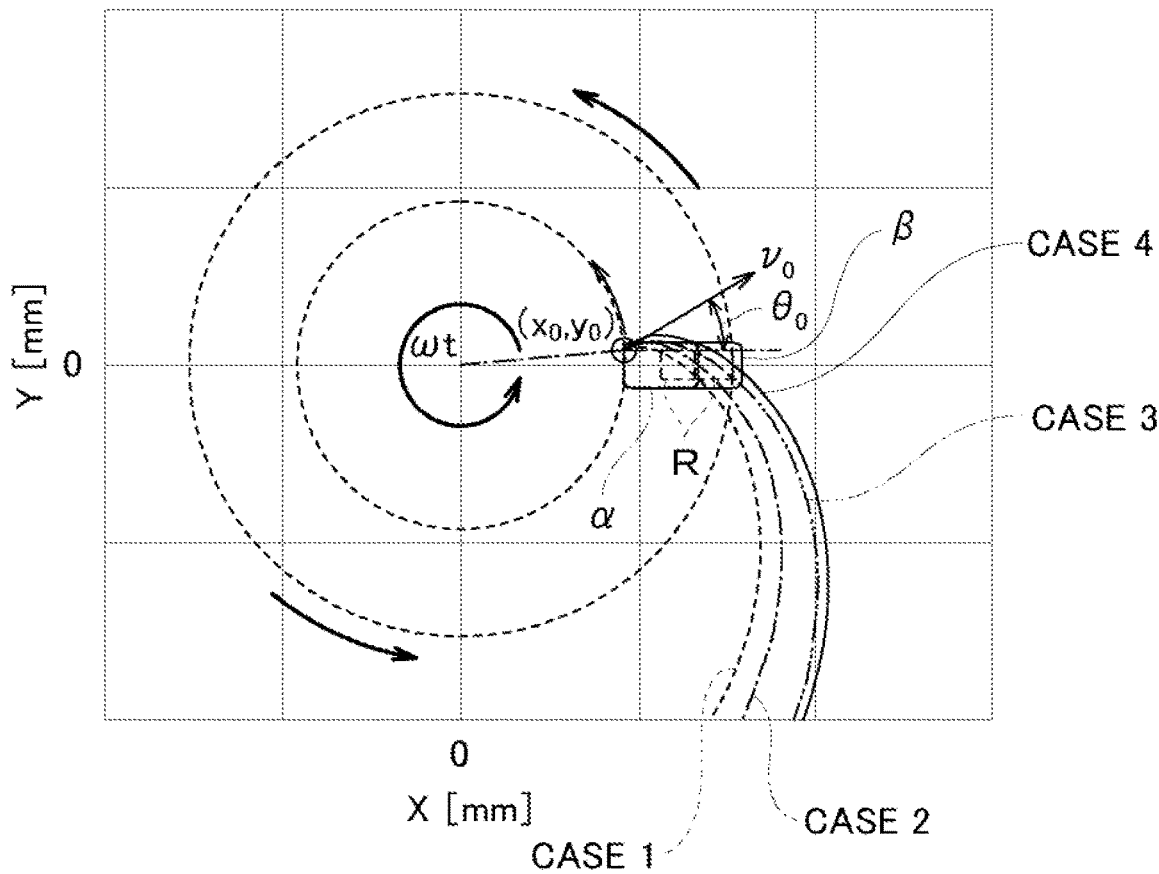
FIG. 10A is a diagram illustrating four examples of discharge trajectories of lubrication oil obtained through simulation using a theoretical formula for the fifth example of an embodiment of the present invention.
Figure 10B:
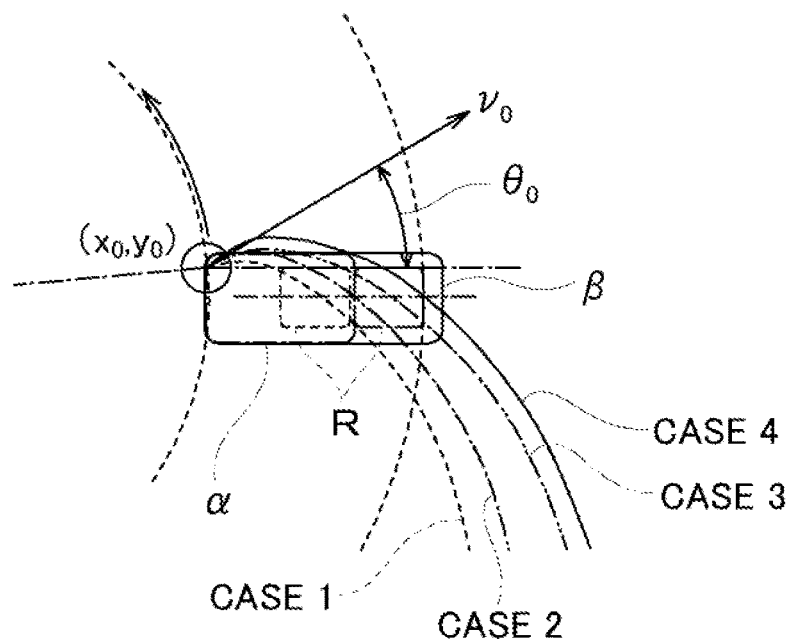
FIG. 10B is a partially enlarged view of FIG. 10A.

FIG. 9, FIG. 10A and FIG. 10B illustrate a fifth example of an embodiment of the present invention. In this example, attention is paid to the fact that the Coriolis force and the centrifugal force that affect the movement trajectory of the lubrication oil change according to the rpm (rotational speed) of the retainer, and a method of determining the optimum inclination angle of the discharge port and the optimum discharge speed of the lubrication oil that takes into consideration the rpm of the retainer will be described.

The equations of motion of the lubrication oil discharged from the discharge port provided in the retainer that rotates during use can be obtained by using the two-dimensional polar coordinates illustrated in FIG. 9, and are expressed by the following Equation (1) and Equation (2).

$$m(d^2x/dt^2)=mx\omega^2+2m\omega(dy/dt) \quad (1)$$

$$m(d^2y/dt^2)=my\omega^2-2m\omega(dy/dt) \quad (2)$$

The meaning of the symbols in FIG. 9 and in Equation (1) and Equation (2), and in Equation (3) and Equation (4) to be described later are as follows.

t: Time x: Position coordinate in the x-axis direction of the discharge port at time t y: Position coordinate in the y-axis direction of the discharge port at time t $x_0$: Initial position coordinate in the x-axis direction of the discharge port $y_0$: Initial position coordinate in the y-axis direction of the discharge port $v_0$: Lubrication oil discharge speed $\theta_0$: Inclination angle of the center axis of the discharge port {an angle with the x axis (center axis of pocket)} m: Weight of lubrication oil

ω: Rotational speed (angular velocity) of retainer (disk)

Furthermore, when a solution is obtained from the above Equations (1) and (2) which are equations of motion, the movement trajectory of the lubrication oil is expressed by the following Equations (3) and (4).

$$x(t)=\{(v_0 \cos\theta_0-y_0\omega)t+x_0\}\cos\omega t+\{(v_0 \sin\theta_0+x_0\omega)t+y_0\}\sin\omega t \quad (3)$$

$$y(t)=\{(v_0 \cos\theta_0-y_0\omega)t+x_0\}\sin\omega t+\{(v_0 \sin\theta_0+x_0\omega)t+y_0\}\cos\omega t \quad (4)$$

To obtain the movement trajectory of the lubrication oil by simulation using the obtained Equation (3) and Equation (4) described above, the rotational speed of the retainer during normal operation of a general toroidal continuously variable transmission is used as the rotational speed ω of the retainer, and the initial position coordinate $x_0$ in the x-axis direction of the discharge port and the initial position coordinate $y_0$ in the y-axis direction of the discharge port are set based on the dimensions of the retainer installed in a general toroidal continuously variable transmission. The movement trajectory of the lubrication oil was determined by simulation while respectively changing the discharge speed $v_0$ of the lubrication oil and the inclination angle $\theta_0$ of the center axis of the discharge port. In this example, the movement trajectory is found for case 1 in which $v_0$ is set to 10 (m/s) and $\theta_0$ is set to 10 (deg), case 2 in which $v_0$ is set to 10 (m/s), and $\theta_0$ is set to 30 (deg), case 3 in which $v_0$ is set to 20 (m/s), and $\theta_0$ is set to 30 (deg), and case 4 in which $v_0$ is set to 20 (m/s), and $\theta_0$ is set to 60 (deg).

According to FIG. 10A and FIG. 10B that illustrate the simulation results for Case 1 to Case 4, in Case 1, since the discharge speed of the lubrication oil is low and the inclination angle of the discharge port is small, and in case 2, since the discharge speed is low, the direction of movement changes toward the rear in the rotational direction immediately after discharge. Therefore, even in case 2 where the movement trajectory of the lubrication oil passes on the outside in the radial direction in comparison with case 1, the roller R arranged on the outermost side in the radial direction of the retainer is separated from the lubrication range indicated by the dot-dash line α. Therefore, in both case 1 and case 2, the movement trajectory of the lubrication oil is not a trajectory by which all of the rollers inside the pocket can be sufficiently lubricated. However, in case 3 and case 4, since the discharge speed of the lubrication oil is high, and the inclination angle of the discharge port is large, the direction of movement changes toward the rear in the rotational direction some time after discharge. Therefore in both case 3 and case 4, when compared with case 1 and case 2, the movement trajectory of the lubrication oil passes over the outside in the radial direction, and passes over the roller R arranged on the outermost side in the radial direction of the retainer. Accordingly, in both case 3 and case 4, the movement trajectory of the lubrication oil is a trajectory by which all of the rollers inside the pocket can be lubricated. Particularly, in case 4, the movement trajectory of the lubrication oil does not pass over the end surface of the roller R, so as indicated by the solid line β, the lubrication range is a large range cover from the inside end portion in the radial direction to the outside end portion in the radial direction of the pocket.

As described above, by using Equation (3) and Equation (4), an optimal inclination angle may be set for the discharge port and an optimal discharge speed may be set for the lubrication oil in accordance to the rpm of the retainer. Furthermore, the discharge speed can be actively controlled in accordance to the rpm of the retainer. More specifically, as the rotational speed of the retainer becomes faster, control is performed to increase the discharge speed, and as the rotational speed of the retainer becomes slower, control is performed to reduce the discharge speed, whereby it becomes possible to supply a necessary and sufficient amount of lubrication oil in accordance to the rpm, and it is possible to suppress the occurrence of agitation resistance (fluid resistance) due to excessive supply of lubrication oil.

REFERENCE SIGNS LIST

1 Toroidal continuously variable transmission
2 Input shaft
3 Ball spline
4a, 4b Outside disk
5 Gear
6a, 6b Inside disk
7 Power roller
8 Trunnion
9 Support shaft
10 Drive shaft
11 Pressing device
12 Cam plate
13 Roller
14, 14a to 14c Retainer 15 Annular portion
16 Cylindrical portion
17 Drive-side cam surface
18 Protruding piece
19 Outer-ring raceway
20 Ball bearing
21 Inner-ring raceway
22 Ball
23 Oil hole
24 Driven-side cam surface
25, 25z Pocket
26a, 26b Protruding portion
27, 27a Oil retaining concave portion
28, 28a to 28c Oil passage
29, 29a to 29c, 29z Discharge port
30a Inner-diameter side branch hole
30b Middle branch hole
30c Outer-diameter side branch hole

The invention claimed is:

1. A pressing device for a toroidal continuously variable transmission, comprising:
    a cam plate having a first cam surface that is uneven in a circumferential direction thereof on one side in an axial direction thereof;
    a disk having an toroidal curved surface with arc-shaped cross section on one side in an axial direction thereof, and a second cam surface on the other side in the axial direction facing the first cam surface and that is uneven in a circumferential direction thereof;
    a retainer arranged between the first cam surface and the second cam surface and having pockets arranged at a plurality of locations in a circumferential direction thereof so that a center axis of the respective pockets is arranged along a radial direction of the retainer; and
    a plurality of rollers, with one or more rollers thereof being rollably held inside the respective pockets;
    the retainer having oil passages for allowing lubrication oil to pass through, and a discharge port is provided on an end portion on a downstream side of the respective oil passages and the discharge port opens to the inside of the respective pockets and discharge lubrication oil to a front side in a rotational direction of the retainer than the center axis of the respective pockets.

2. The pressing device for a toroidal continuously variable transmission according to claim 1, wherein
    the discharge port opens to an inside surface in the radial direction of the pocket, and the center axis of the discharge port is inclined toward the front side in the rotational direction with respect to the center axis of the respective pockets.

3. The pressing device for a toroidal continuously variable transmission according to claim 2, wherein
    the discharge port is provided on the inside surface in the radial direction of the respective pockets on the front side in the rotational direction than the center axis of the respective pockets.

4. The pressing device for a toroidal continuously variable transmission according to claim 2, wherein
    two or more rollers of the plurality of rollers are arranged in a row in the radial direction of the retainer inside the respective pockets.

5. The pressing device for a toroidal continuously variable transmission according to claim 1, wherein
    the discharge port is provided on the inside surface in the radial direction of the respective pockets on the front side in the rotational direction than the center axis of the respective pockets.

6. The pressing device for a toroidal continuously variable transmission according to claim 5, wherein
    two or more rollers of the plurality of rollers are arranged in a row in the radial direction of the retainer inside the respective pockets.

7. The pressing device for a toroidal continuously variable transmission according to claim 1, wherein
    two or more rollers of the plurality of rollers are arranged in a row in the radial direction of the retainer inside the respective pockets.

8. The pressing device for a toroidal continuously variable transmission according to claim 1, wherein
    the discharge port is open on one side surface of the pair of side surfaces in the circumferential direction of the respective pockets that is on the front side in the rotational direction.

9. The pressing device for a toroidal continuously variable transmission according to claim 8, wherein
    two or more rollers of the rollers are arranged in a row in the radial direction of the retainer inside the respective pockets, and the discharge port faces in the circumferential direction of the retainer a rolling surface of at least one roller arranged on an innermost side in the radial direction of the retainer of the two or more rollers held inside the respective pockets.

10. The pressing device for toroidal continuously variable transmission according to claim 9, wherein
    two or more discharge ports are provided as the discharge port, and the two or more discharge ports face in the circumferential direction of the retainer the rolling surface of the one roller arranged on the innermost side in the radial direction of the retainer and a rolling surface of other one or more roller of the two or more rollers held inside the respective pockets.

* * * * *